United States Patent

Oh et al.

[11] Patent Number: 5,886,743
[45] Date of Patent: Mar. 23, 1999

[54] OBJECT-BY INFORMATION CODING APPARATUS AND METHOD THEREOF FOR MPEG-4 PICTURE INSTRUMENT

[75] Inventors: Seong-Jun Oh; Sung-Moon Chun; Joo-Hee Moon; Jae-Kyoon Kim, all of Seoul, Rep. of Korea

[73] Assignee: Hyundai Electronics Industries Co. Ltd., Kyonggi-Do, Rep. of Korea

[21] Appl. No.: 478,921

[22] Filed: Jun. 7, 1995

[30] Foreign Application Priority Data

Dec. 28, 1994 [KR] Rep. of Korea .................. 1994 38014
Dec. 28, 1994 [KR] Rep. of Korea .................. 1994 38015
Dec. 28, 1994 [KR] Rep. of Korea .................. 1994 38017

[51] Int. Cl.$^6$ ....................................................... H04N 7/50
[52] U.S. Cl. ........................... 348/407; 348/399; 348/402
[58] Field of Search ................................ 348/19, 20, 399, 348/402, 407, 699, 413, 416; H04N 7/50

[56] References Cited

U.S. PATENT DOCUMENTS

| | | | |
|---|---|---|---|
| 4,520,401 | 5/1985 | Takahashi et al. ........................ | 358/310 |
| 5,079,630 | 1/1992 | Golin et al. ................................ | 348/399 |
| 5,198,901 | 3/1993 | Lynch ........................................ | 348/413 |
| 5,245,697 | 9/1993 | Suzuoka . | |
| 5,260,782 | 11/1993 | Hui ........................................... | 348/409 |
| 5,280,530 | 1/1994 | Trew et al. ................................ | 348/20 |
| 5,301,032 | 4/1994 | Hong et al. . | |
| 5,357,584 | 10/1994 | Yamaoka . | |
| 5,416,522 | 5/1995 | Igarashi .................................... | 348/416 |
| 5,471,247 | 11/1995 | Hartnack .................................. | 348/402 |
| 5,510,840 | 4/1996 | Yonemitsu et al. ..................... | 348/402 |
| 5,517,246 | 5/1996 | Suzuki ..................................... | 348/412 |

*Primary Examiner*—Howard Britton
*Attorney, Agent, or Firm*—Bryan Cave LLP

[57] ABSTRACT

An object based video information coding apparatus and method for an MPEG-4 system compresses image data without reducing image quality by converting motion-incompensable objects using image data blocks. The method includes the steps of i) separating moving and non-moving background imagery from an input image; ii) selecting motion-compensable objects and motion-incompensable objects from the moving imagery; iii) separating motion information and shape information from motion-compensable objects; iv) separating shape information and image information for motion-incompensable objects; v) dividing motion-incompensable object into N×N blocks; vi) discrete cosine transforming pixels in the N×N blocks using an N×N discrete cosine transform. In one embodiment, the pixels of the motion-incompensable object not in the N×N blocks are differential pulse code modulated. In another embodiment, the motion-incompensable object is first divided into 8×8 blocks. The remaining pixels are then divided into 4×4 blocks.

12 Claims, 10 Drawing Sheets

OBJECT-BY INFORMATION CODING APPARATUS AND METHOD THEREOF FOR MPEG-4 PICTURE INSTRUMENT

BACKGROUND OF THE INVENTION

1. Field of the Invention

The present invention relates to an object based video information coding apparatus and method for an MPEG-4 system, and more particularly to an improved object based video information coding apparatus and method capable of compressing image data without reducing image quality by processing motion-incompensable objects into hierarchical image data blocks and transforming the data blocks using a Discrete Cosine Transform.

2. Description of the Conventional Art

Generally, MPEG-4 is used for compressing and reproducing moving images using a spatial correlation of the images. It uses a Discrete Cosine Transform (hereinafter "DCT") to eliminate redundancies in the image, and performs motion compensation.

Referring to FIGS. 1A and 1B, in MPEG-4, images are classified into three types: I-frame images, P-frame images, and B-frame images. In I-frame type images, the images are coded using a discrete cosine transform circuit 106 with no prediction of motion. In P-frame type images, motion is predicted only in the forward direction. In B-frame type images, motion is predicted in both forward and backward directions.

An image at a first input terminal 101 is reconstructed by a first frame reconstruction circuit 102. The motion of the image outputted from first frame reconstruction circuit 102 is predicted by a motion prediction circuit 122. A first motion compensation circuit 121 performs motion compensation using a motion vector 123. An inter/intra analyzing circuit 124 determines whether a macro block being processed is in an Inter Mode, which is a motion compensation mode, or an Intra Mode, which performs a discrete cosine transform without a motion compensation, and controls a first switching circuit 125 accordingly.

The image outputted from first frame reconstruction circuit 102 is outputted to a subtractor 103, which produces a differential image. A frame/field analyzing circuit 104 determines a discrete cosine transform type for the image. A frame/field formatting circuit 105 converts the image data based upon a cosine type determined by frame/field analyzing circuit 104.

The output of the frame/field formatting circuit 105 is converted to a frequency component signal by a discrete cosine transform circuit 106. The discrete cosine-converted frequency component signal is quantized by a quantization circuit 107 and inputted to a zig-zag scan conversion circuit 108. The quantized coefficient value outputted from quantization circuit 107 is scanned in a zig-zag scan by zig-zag scan conversion circuit 108. The output thereof is detected by run-and-fixed length decoder 109 by the number of zeros and levels.

Quantization circuit 107 receives a control signal in accordance with the state of a first buffer circuit 110. If a large number of bit arrays are stored in first buffer circuit 110, the quantization control circuit reduces the number of bits by increasing a quantization scale value. If a small number of bit arrays are stored in first buffer circuit 110, the quantization scale value is decreased and the number of bits in first buffer circuit 110 thereby increases.

The run and level data obtained by zig-zag scan conversion circuit 108 is converted into a bit array corresponding to an MPEG-4 main profile along with additional information such as motion vector 123, and is then outputted to an output terminal 126 at a predetermined bit rate.

In addition to the foregoing, the output of zig-zag scan conversion circuit 108 is decoded through a first inverse zig-zag scan conversion circuit 112, a first inverse quantization circuit 113, a first inverse discrete cosine transform circuit 114, a first inverse frame/field formatting circuit 115, and the decoded output signal is added to a motion-compensated image by a first adder 116 and is thereby recovered.

The recovered images are stored in a first backward reference image memory 120 by a second switching circuit 117 for use in motion prediction and motion compensation, depending upon the coding type of an image received through a second input terminal 118. The stored images are also moved to a first forward prediction reference image memory 119 for when I-frame image or P-frame images are coded.

FIG. 2 shows a conventional MPEG-4 video decoder for recovering an MPEG-4 bit stream for display on a monitor. A bit stream outputted from a third input terminal 201 is stored in a second buffer circuit 202. A run-and-fixed length decoder 203 decodes information about the image, such as discrete cosine transform coefficients, motion vectors, intra/inter mode, and coding type.

The decoded discrete cosine transform coefficient information is recovered by a second inverse zig-zag scan conversion circuit 204. For I-frame images (intra mode), the information is recovered into an image through a second quantization circuit 205 and a second inverse frame/field formatting circuit 207. For P-frame and B-frame images (inter mode) the information is recovered into a differential image. A second inverse discrete cosine conversion circuit 206 is used as well.

The recovered differential image is added to a motion compensation image by an adder 208 and is recovered into an image by a second frame reconstruction circuit 209. The image is then outputted to an output terminal 218 for display.

The recovered image is stored in a second backward prediction reference image memory 215 through a fourth switching circuit 216 in case the coding type of an image input through a sixth input terminal 217 is a B-type image, and is moved from second backward prediction reference image memory 215 to a second forward prediction reference image memory 214 for when an I-frame image or P-frame image is decoded.

The second motion-compensation circuit 212 performs motion-compensation using a motion vector outputted from a fifth input terminal 213, which is obtained by run-and-fixed length decoder 203. The motion image compensated by the second motion compensating circuit 212 is transferred to a second adder 208 through a third switching circuit 210 for processing when an inter mode is detected by an intra/inter mode decision 211 as determined by run-and-fixed length decoder 203.

Conventional MPEG-4 video coders and decoders are disadvantageous in that the images produced by such systems are of low quality because the compressed image data transferred in a coded form is simply recovered to an original image data.

SUMMARY OF THE INVENTION

Accordingly, it is an object of the present invention to provide an object based video information coding apparatus and method for an MPEG-4 system which overcome the problems encountered in conventional object based video information coding systems.

It is another object of the present invention to provide an improved object based video information coding apparatus and method capable of compressing image data without reducing image quality by converting objects in the images using hierarchically different size image data blocks.

To achieve the above objects, there is provided an object based video information coding apparatus which includes: a moving image extracting circuit for extracting unmoving background and moving objects from an input image signal; an object selection and separation circuit for selecting and separating motion-compensable objects from the moving image extracting circuit; a first object information separating circuit for separating a motion information and a shape information from a motion-compensable object outputted from the object selection and separation circuit; a second object information separating circuit for separating a shape information and image information from motion-incompensable objects outputted from the first object information separating circuit; a block location scanning circuit for dividing motion-incompensable objects outputted from the second object information separating circuit into N×N blocks; a discrete cosine transform circuit for performing a discrete cosine transform on pixels of a motion-incompensable object outputted from the block location scanning circuit that are included within a block by a predetermined level and for outputting the converted information to a decoding circuit; and a differential pulse code modulation decoding circuit for differential pulse code modulating pixels of a motion-incompensable object obtained from the block location scanning circuit that are not within an N×N block and for outputting the modulated information to a decoding circuit.

To achieve the above objects, there is provided an object based video information coding apparatus which further includes a moving image extracting circuit for separating moving and non-moving background images from the input image signal; an object selection separating circuit provided for selecting motion-compensable objects and motion-incompensable objects from the moving imagery extracted from the moving image extracting circuit; a first object information separating circuit provided for separating motion information and shape information for the motion-compensable objects outputted from the object selection separating circuit; a second object information separating circuit provided for separating shape information and image information from motion-incompensable objects outputted from the object selection separating circuit; a frame-difference value detection circuit for computing the difference between pixel values of a current image of a motion-incompensable object and pixel values of a previous image using a motion vector of the image signal; a fixed block separating circuit provided for dividing a motion-incompensable object into 8×8 blocks using a difference value obtained by the frame-difference value detection circuit and for dividing a remaining region of the motion-incompensable object into 4×4 blocks; an 8×8 discrete cosine transform coding circuit for coding the pixels in the 8×8 blocks using a discrete cosine transform; and a 4×4 discrete cosine transform coding circuit for coding the pixels the 4×4 blocks using a discrete cosine transform.

There is further provided an object based video information coding method which includes the steps of separating an input image into background imagery which is not moving and that which is moving; selecting motion-compensable objects and motion-incompensable objects from the background imagery; separating motion and shape information from motion-compensable objects; separating shape and image information from motion-incompensable objects; computing a difference between the pixel values of a current image corresponding to a motion-incompensable object and pixel values of a previous image using a motion vector; dividing a motion-incompensable object into 8×8 blocks using the differential value obtained by the prior step and dividing the remainder of the object into 4×4 blocks; coding the pixels of the motion-incompensable object that are in 8×8 blocks with an 8×8 discrete cosine transform; and coding the pixels of the motion-incompensable object that are in 4×4 blocks using a 4×4 discrete cosine transform.

DETAILED DESCRIPTION OF THE INVENTION

Figure 1A:
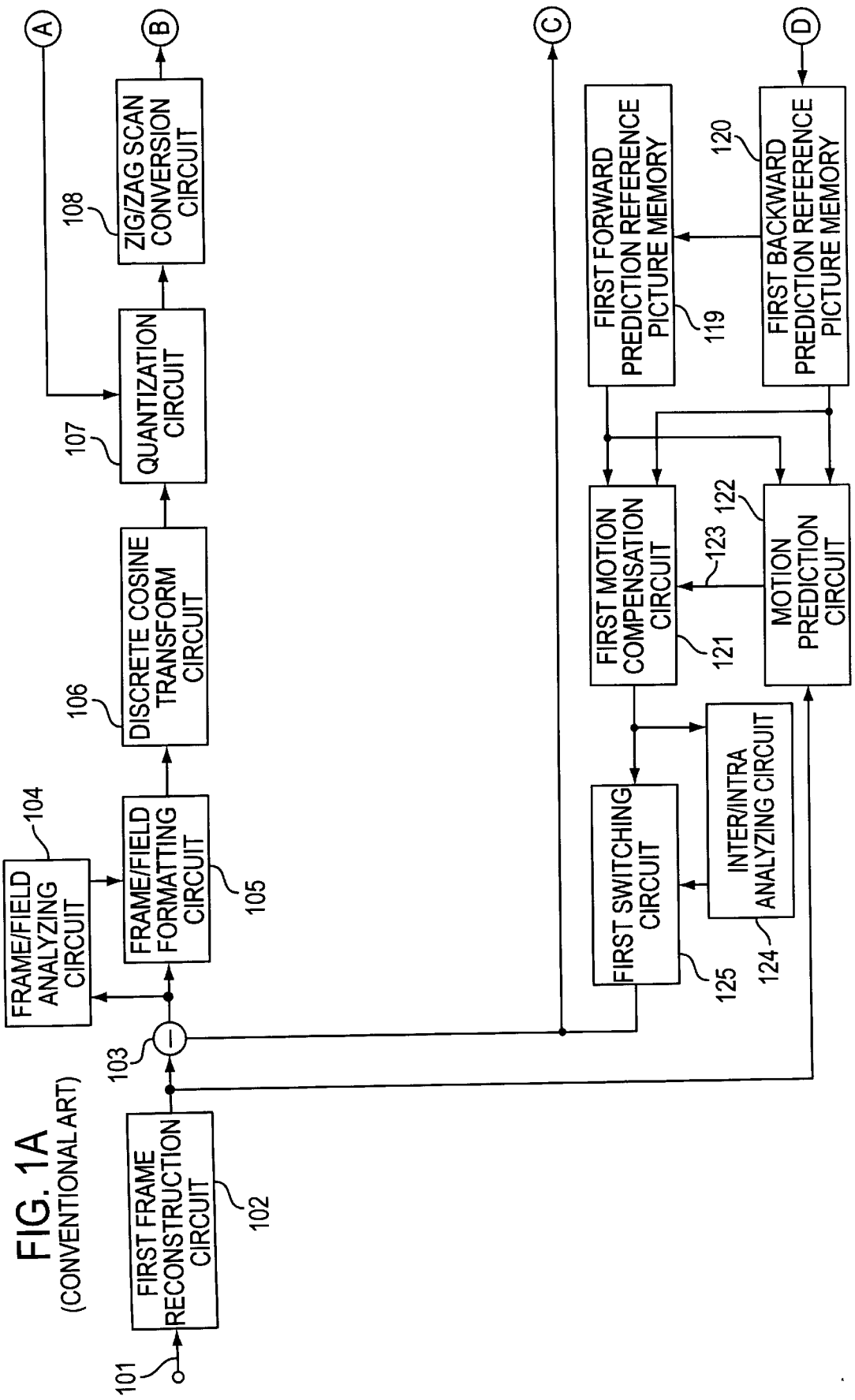
FIGS. 1A and 1B are block diagrams of a conventional MPEG-4 video coder system.
Figure 1B:
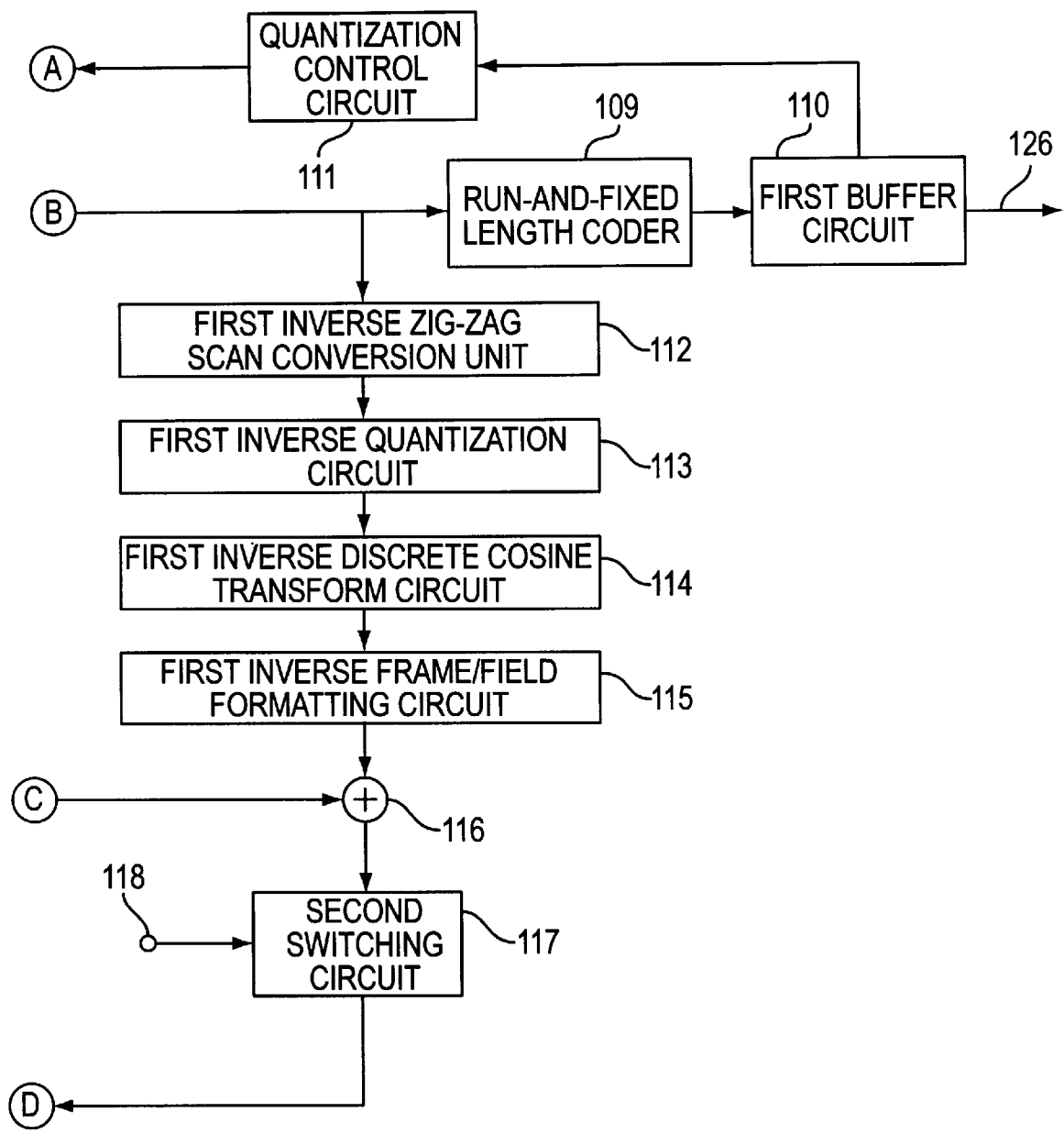
Figure 2:
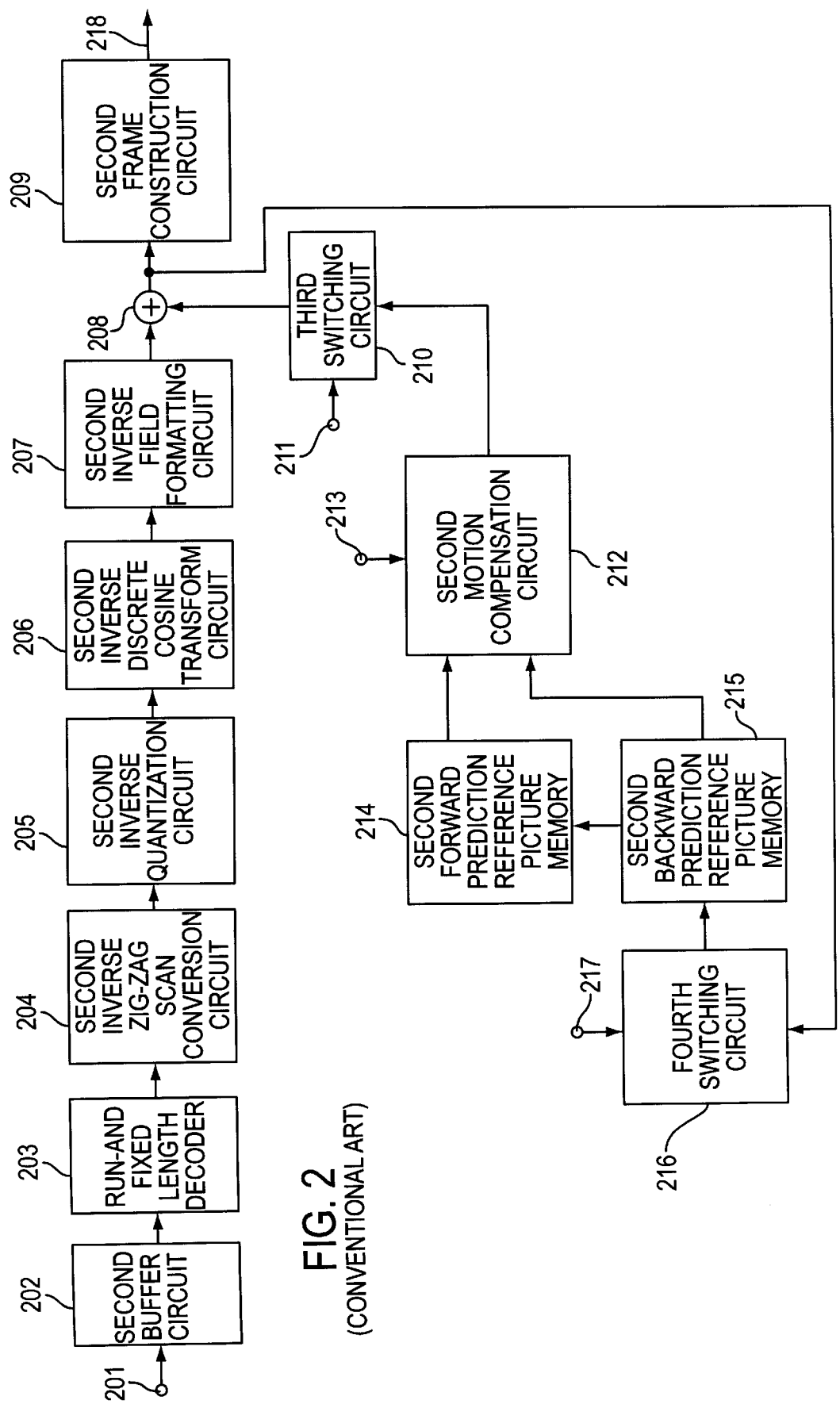
FIG. 2 is a block diagram of a conventional MPEG-4 video decoder system.
Figure 3:
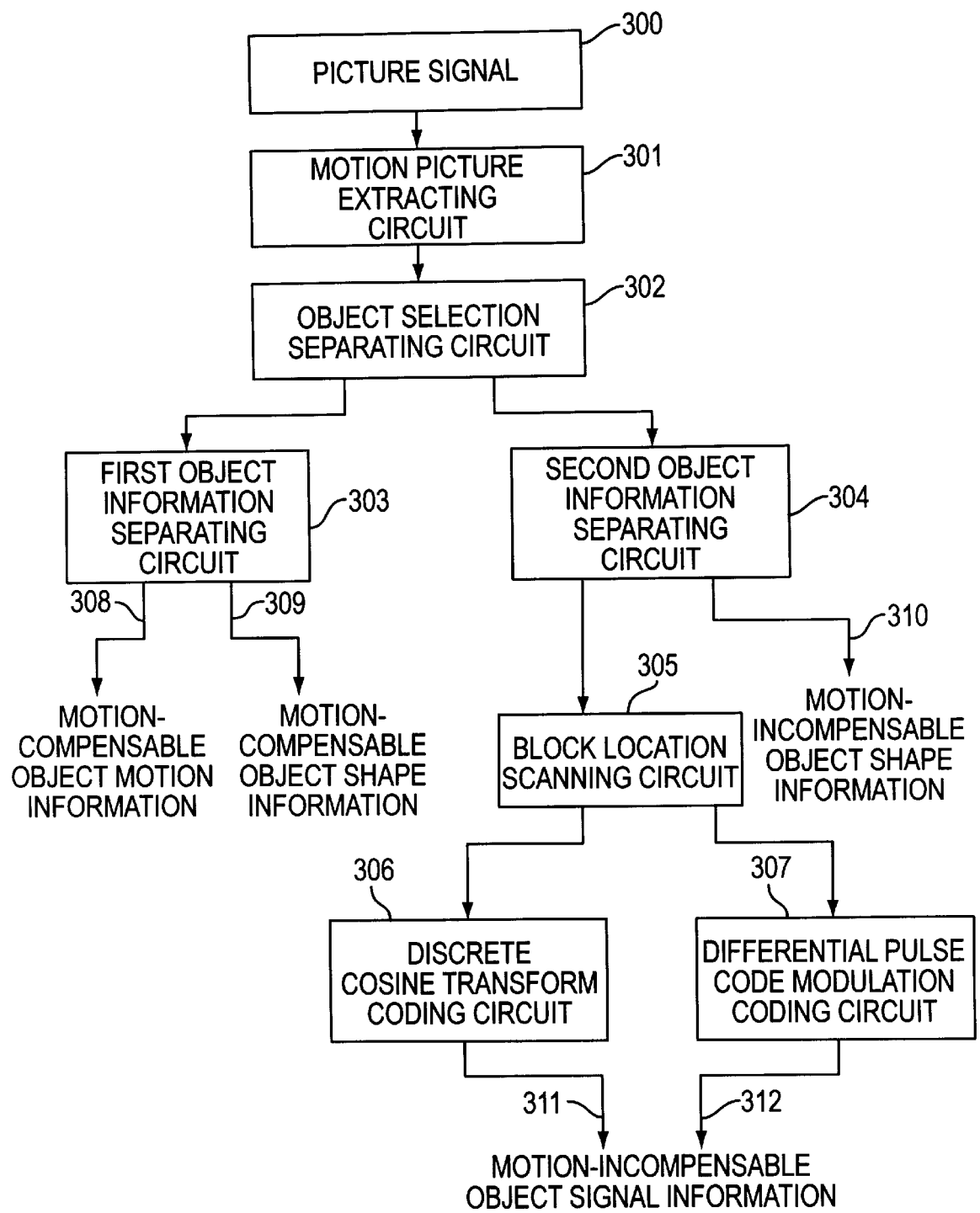
FIG. 3 is a block diagram of an object based video information coding apparatus in accordance with a first embodiment of the invention.

FIG. 3 shows an object based video information coding apparatus according to the present invention. A moving image extracting circuit 301 extracts non-moving background imagery from moving images. An object selection separating circuit 302 separates motion-compensable objects from motion-incompensable objects. A first object information separating circuit 303 separates motion information and shape information from motion-compensable objects outputted from object selection separating circuit 302 and output this data through output terminals 308 and 309. A second object information separating circuit 304 separates shape information and image information for the motion-incompensable objects outputted from object selection separating circuit 302 and transfers the shape information to an output terminal 310.

A block location scanning circuit 305 divides the entire image of the motion-incompensable image outputted from second object information separating circuit 304 into N×N blocks. A discrete cosine transform coding circuit 306 converts, using a discrete cosine transform, the pixels of the motion-incompensable object within the N×N blocks and transfers this information to output terminal 311. A differential pulse code modulation circuit 307 modulates the pixels of the motion-incompensable object that are outside the boundaries of the N×N blocks and outputs this data to output terminal 312.

A motion-compensable object is a moving object having a predetermined theory of movement, such as horizontal movement, rotational movement, and the like, in a state that the object in three dimensional space is converted into a two-dimensional image. A motion-incompensable object refers to an object which is not governed by such a movement theory.

The operation of the first embodiment of the present object based video information coding apparatus will now be discussed with reference to FIGS. 3–6.

When an image signal 300 is inputted, extracting circuit 301 separates non-moving background from the moving portions of the image. The method of extracting the moving portions of the image is performed using a motion vector which varies from an initial image, so that the varied regions of each frame, i.e., the moving portions of the image, are obtained. Thereafter, object selection separating circuit 302 separates the motion-compensable and motion-incompensable objects from the extracted images.

Object selection circuit 302 identifies motion-compensable objects A, which move with horizontal, rotational, linear, or other movement, and motion-incompensable objects B which do not meet the above conditions. The motion-compensable objects B separated by object selection separating circuit 302 are divided into motion information and shape information by first object information separating circuit 303 and outputted through output terminals 308 and 309.

Figure 4:
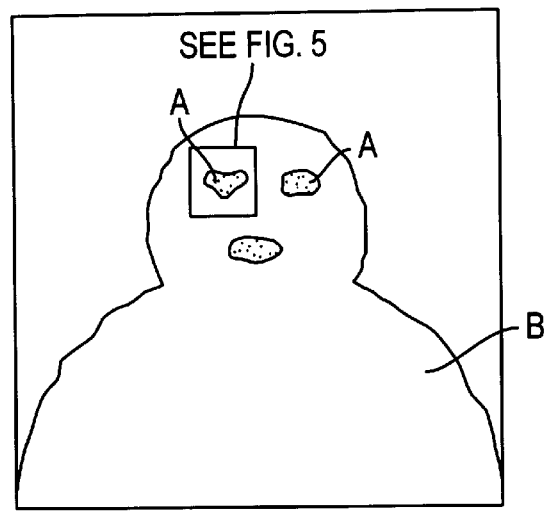
FIG. 4 is a view showing a motion-compensable object and a motion-incompensable object being separated from an input image.

FIG. 4 shows an example of separating a motion-compensable object B and a motion-incompensable object A from an input image signal. Moving image extracting circuit 301 separates the objects A and B from the background image, and the motion-compensable or -incompensable object selection circuit 302 separates images A and B.

Figure 5:
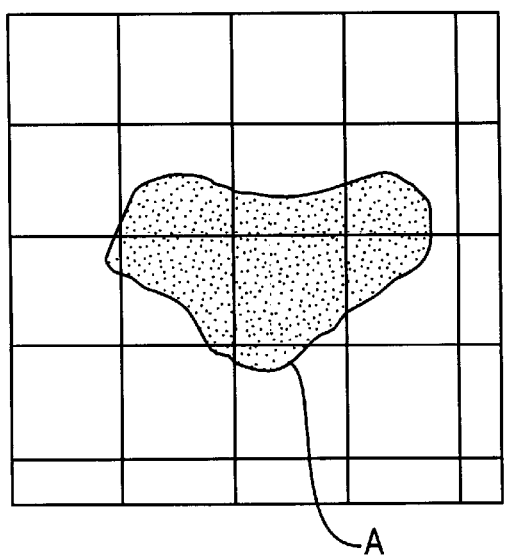
FIG. 5 is an enlarged view of a motion-incompensable object of FIG. 4.
Figure 6:
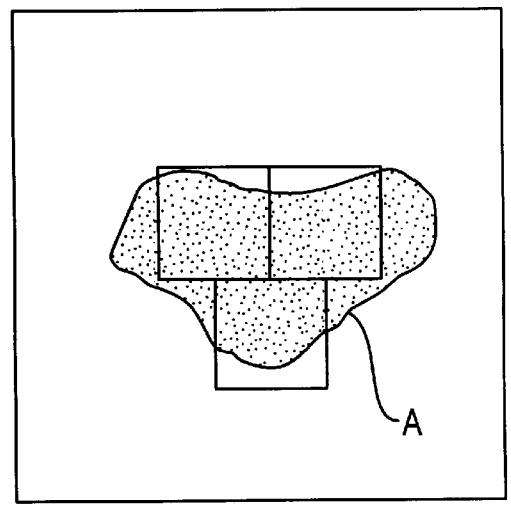
FIG. 6 is a view of the motion-incompensable object being fitted within blocks.

As shown in FIGS. 5 and 6, to more efficiently code a motion-incompensable object A, the object outline is fit within N×N blocks. The pixels of the motion-incompensable object within the blocks are modulated by a discrete cosine transform scanning circuit 306 and output to a decoding apparatus through output terminal 311. The region that is not within the N×N block is modulated by a differential pulse code modulation coding circuit 307 and output to a decoding apparatus through output terminal 312. The information coded by the discrete cosine transform coding circuit 306 and the differential pulse code modulation coding circuit 307 is transferred to a receiving terminal as motion-incompensable object signal information.

In the receiving terminal, the shape information and signal information of the motion-incompensable object B is decoded using the same method as at the sending terminal.

Figure 7:
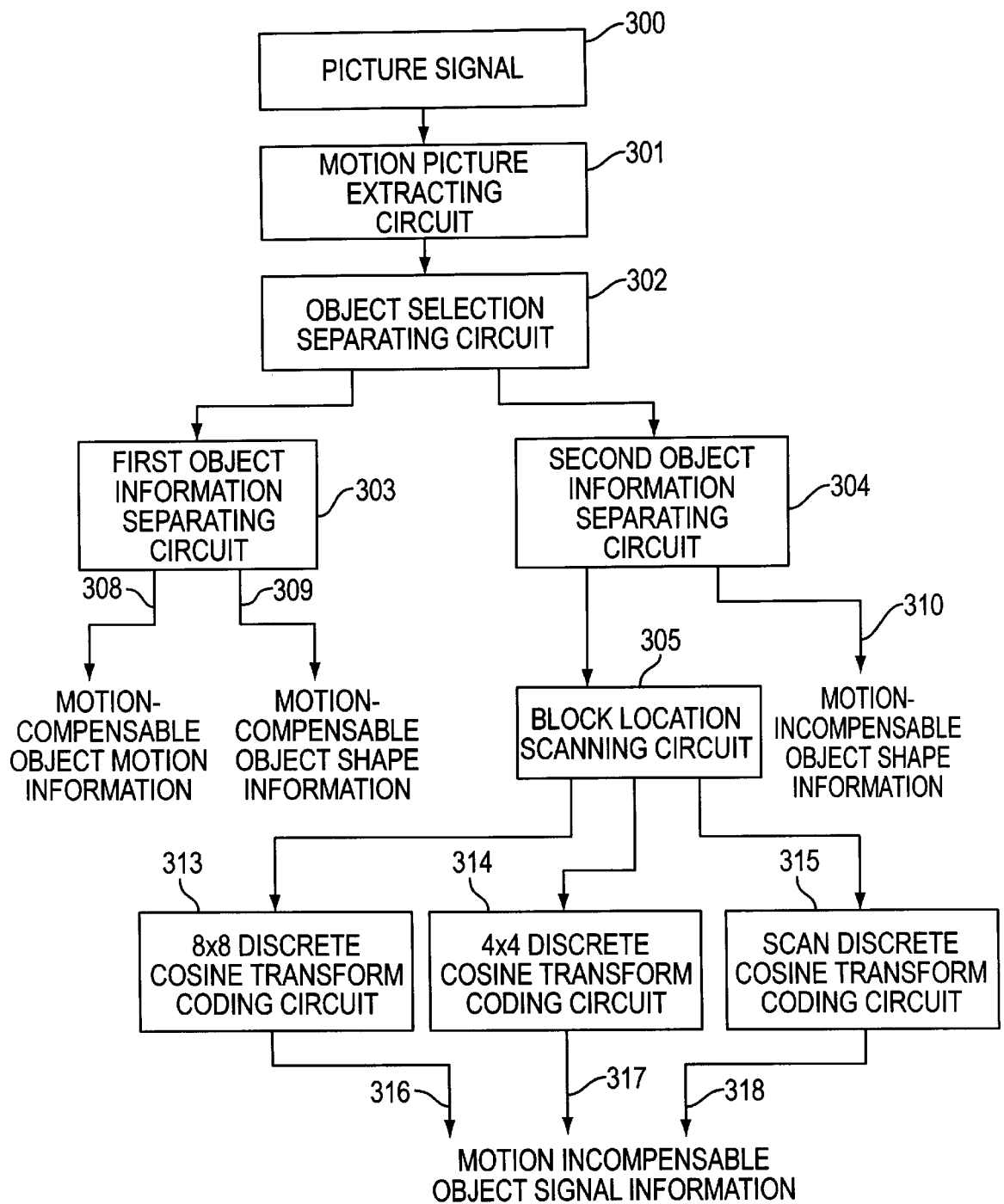
FIG. 7 is a block diagram of an object based video information coding apparatus in accordance with a second embodiment.

FIG. 7 shows an alternative object based video information coding apparatus system and method. In this embodiment the motion-incompensable object is processed into image data blocks that are made hierarchically different, and the remaining regions are then processed.

An 8×8 discrete cosine transform coding circuit 313 codes pixels of a motion-incompensable object obtained by block location scanning circuit 305 after zig-zag scanning, quantization, and run-length coding. A 4×4 discrete cosine transform coding circuit 314 codes the pixels of the motion-compensable object not already in 8×8 blocks into 4×4 blocks after zig-zag scanning, quantization, and run-length coding. Finally, a discrete cosine transform coding circuit 315 scans the remaining regions of the object not already processed in the 8×8 blocks and the 4×4 blocks.

Figure 8:
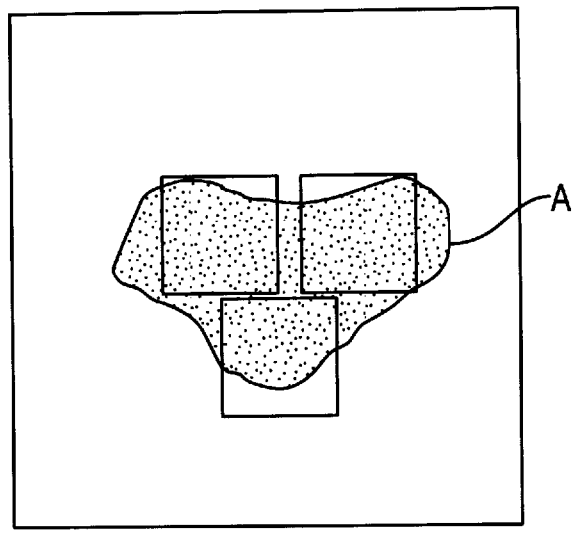
FIG. 8 is a view of a motion-incompensable object being fitted in 8×8 blocks using the method of FIG. 7.

Block location scanning circuit 305 scans the entire image to identify 8×8 blocks in the outline of the object. That is, as shown in FIG. 8, block location scanning circuit 305 identifies pixels within 8×8 blocks of a motion-incompensable object. These pixels are coded through 8×8 discrete cosine transform coding circuit 313 after zig-zag scanning, quantization, and run-length coding. The coded pixels are then output to an output terminal 316.

Figure 9:
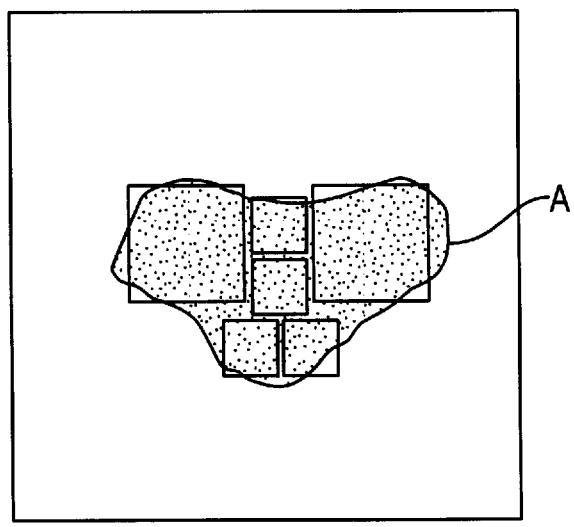
FIG. 9 is a view of a motion-incompensable object being fitted within the remaining region after being fit into 8×8 blocks.
Figure 10:
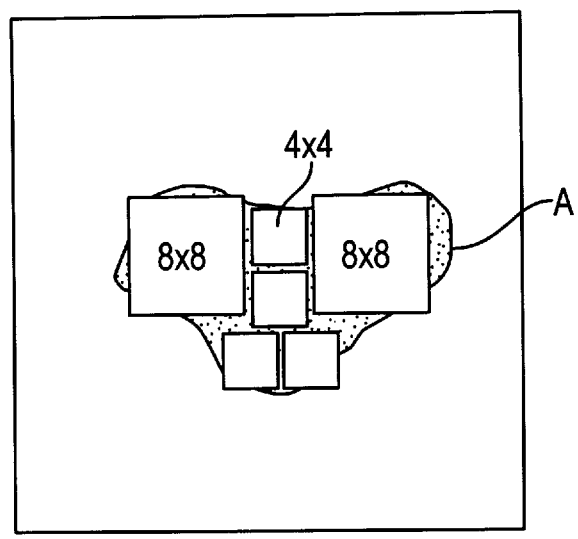
FIG. 10 is a view of a remaining region obtained after being fitted into 8×8 and 4×4 blocks.
Figure 11:
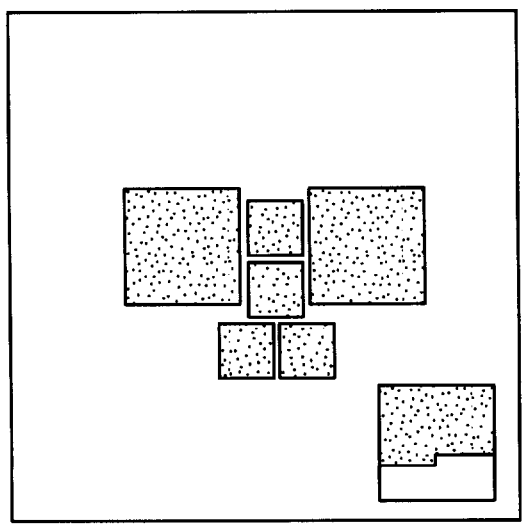
FIG. 11 is a view of the region scanned and the remaining region after being fitted into 8×8 and 4×4 blocks.

The regions of the object not within the 8×8 blocks are scanned in 4×4 blocks in the remaining image by block location scanning circuit 305. Referring to FIG. 9, the pixels in the 4×4 blocks scanned by block location scanning circuit 305 are coded by 4×4 discrete cosine transform coding circuit 314 and transferred to output terminal 317. Finally, as shown in FIGS. 10 and 11, the remaining uneven regions, are coded by the discrete cosine transform coding circuit 315 and transferred to output terminal 318 after zig-zag scanning, quantization, and run-length coding, thereby reducing the amount of data without decreasing the quality of the image. Thereafter, two pieces of coded information are transferred to the receiving terminal for the motion-incompensable object.

The receiving terminal receives shape information and signal information of a motion-incompensable object and decodes the information. The operation at the receiving terminal is the inverse of the sending terminal. That is, the entire image is scanned with shape information. A predetermined block is selected if the pixels of a motion-incompensable object within the 8×8 block exceed a predetermined level, the information within the above block is recovered using an inverse discrete cosine after decoding, inverse quantization, and inverse zig-zag scanning.

In a block, if the amount of pixel of a motion-incompensable object exceeds a predetermined level, the block is selected and converted by decoding, inverse quantization, and inverse zig-zag scanning, so that the image of the block is recovered.

In addition, the scan discrete cosine transform coding is performed by the sending terminal. The 8×8 and 4×4 blocks are converted by the receiving terminal using an inverse discrete cosine transform, so that a motion-incompensable object is recovered using shape information of the motion-incompensable object.

Figure 12:
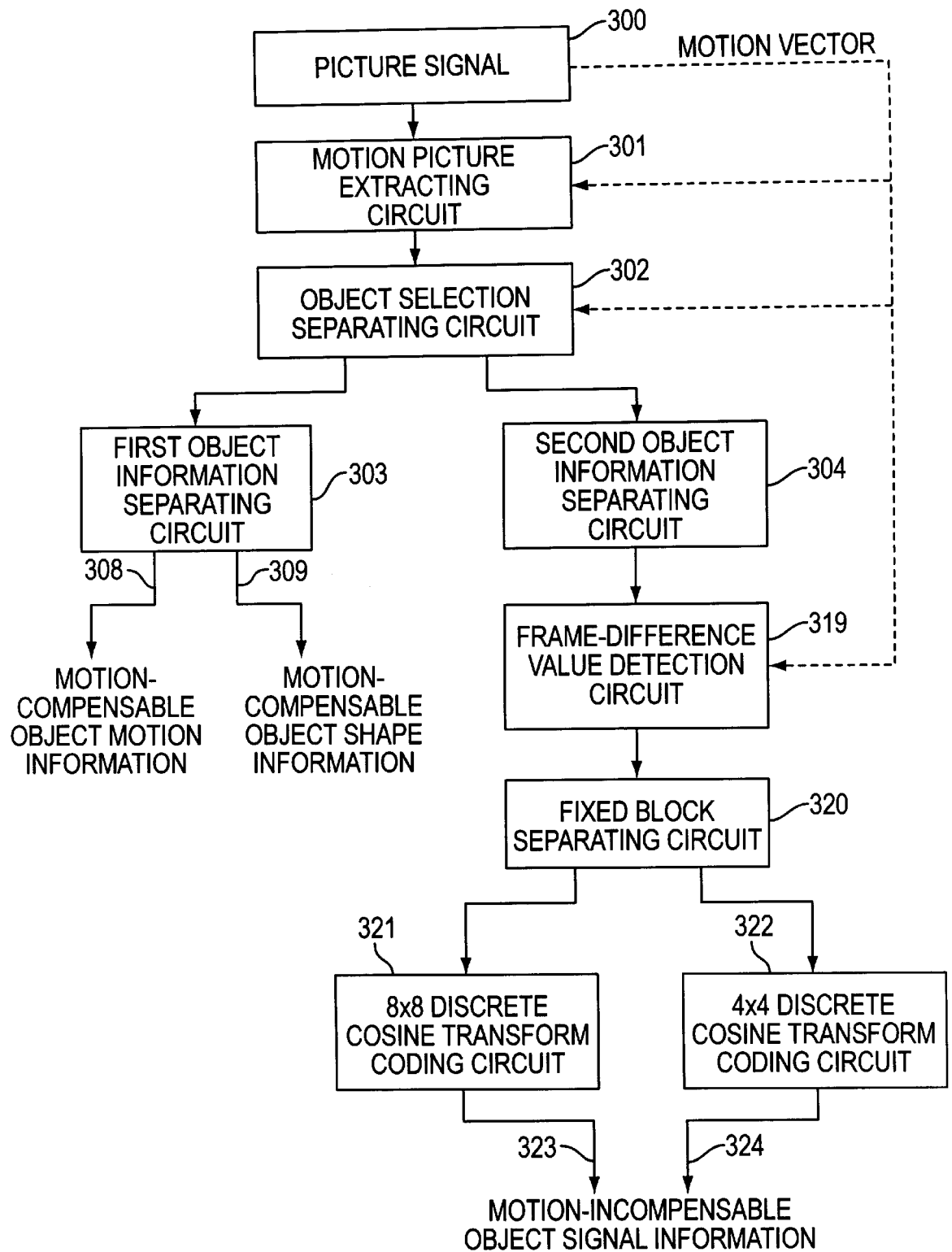
FIG. 12 is a block diagram of an object based video information coding apparatus in accordance with a third embodiment.

FIG. 12 shows a third embodiment of the present invention. The third embodiment reduces data by using differential pixel values for image signal compression and recovers motion-incompensable objects using only signal information and not shape information.

A frame difference value detection circuit 319 computes a differential value between the pixel values of a current image with respect to a motion-incompensable object outputted from the second object information separating circuit 304 and the pixel values of a previous image using a motion vector of image signal 300. A fixed block separating circuit 320 divides the entire image into 8×8 blocks using the differential values obtained by the frame difference value detection circuit 319 and divides the region of the outline portion of the object into 4×4 blocks. An 8×8 discrete cosine transform coding circuit 321 codes the pixels of a block using an 8×8 discrete cosine transform if the number of pixels of a motion-incompensable object obtained by the fixed block separating circuit 320 exceeds a predetermined amount, and transfers the coded information through an output terminal 323 after a zig-zag scanning, quantization, and run-length coding. A 4×4 discrete cosine transform coding circuit 322 codes pixels of 4×4 blocks using a discrete cosine transform if the motion-compensable object obtained by fixed block separating circuit 320 has 4×4 blocks and transfers this information to output terminal 324 after zig-zag scanning, quantization, and run-length coding.

As in the prior embodiments, shape information and signal information are separated by the second object information separating circuit 304. However, these are transferred to frame difference value detection circuit 319.

Frame difference value detection circuit 319 computes the difference between the pixel values of a current image and the pixel values of a previous image using a motion vector and transfers the computed value to fixed block separating circuit 320.

Figure 13:
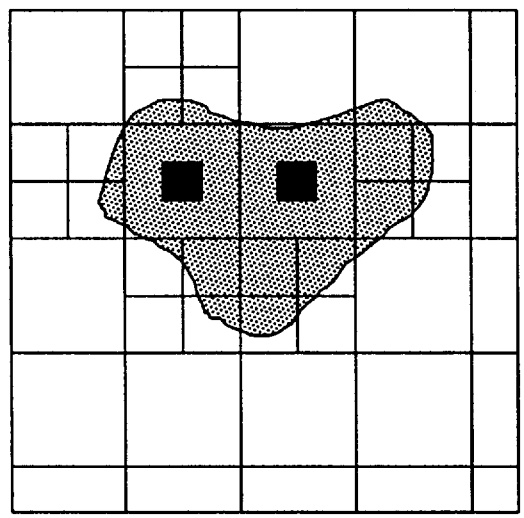
FIG. 13 is a view of a motion-incompensable object being fitted into 8×8 blocks using the method of FIG. 12.

The fixed block separating circuit 320, as shown in FIG. 13, divides the entire image into 8×8 blocks using the differential values obtained by frame difference value detection circuit 319, transfers the division information to an 8×8 discrete cosine transform coding circuit 319, divides the outer portion of the motion-incompensable object into 4×4 blocks and transfers the division information to a 4×4 discrete cosine transform coding circuit 322.

The 8×8 discrete cosine transform coding circuit 321 codes, using a discrete cosine transform, the 8×8 blocks shown in FIG. 13 of a motion-incompensable object outputted from the fixed block separating circuit 320, performs a zig-zag scanning, quantization, and run-length coding, and transfers the resulting data to output terminal 323. At this point, the blocks within the motion-incompensable object are coded using a discrete cosine.

Figure 14:
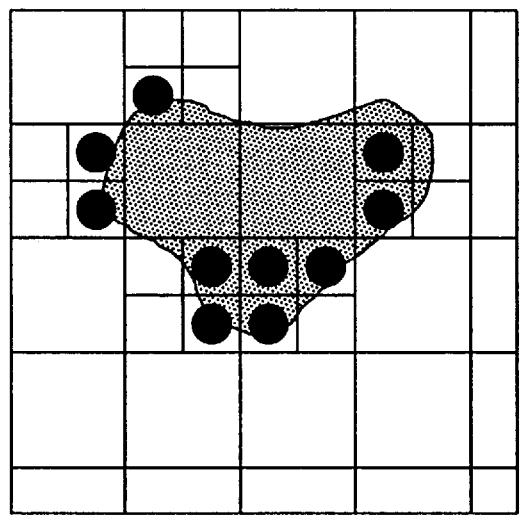
FIG. 14 is a view of a motion-incompensable object being fitted into 4×4 blocks using the method of FIG. 12.

4×4 discrete cosine transform coding circuit 322 codes, using a discrete cosine transform, the 4×4 blocks shown in FIG. 14 of a motion-incompensable object outputted from the fixed block separating circuit 320, performs a zig-zag scanning, quantization, and run-length coding and transfers the resultant data to output terminal 324.

Accordingly, two coded pieces of information are transferred to the receiving terminal as information describing the motion-incompensable object, so that data transfer for motion-incompensable objects can be reduced. It is not necessary to send shape information on the motion-incompensable object.

In a receiving terminal, shape information and signal information of the motion-incompensable object are decoded in an inverse procedure. That is, the images are recovered through run-length decoding, inverse zig-zag scanning, and an inverse discrete cosine transform.

In addition, the motion-incompensable object can be recovered using signal information but not shape information for a motion-incompensable object by performing an inverse discrete cosine transform after a run-length decoding, inverse quantization, inverse zig-zag scanning for information in the 4×4 and 8×8 blocks.

Using the signal processing of the invention at transmitting and receiving terminals, enables the data transfer rate to be affected. In addition, since the same shape information is used by both terminals, error occurrence can be prevented. Moreover, since the sizes of the blocks are hierarchically differentiated and the blocks are converted using a discrete cosine transform, the amount of data can be reduced without reducing image quality. In addition, for compressing image data, the present invention converts the differential value of pixel between images and reduce the amount of data, so that data recovery can be achieved using signal information but not shape information for motion-incompensable objects.

Finally, in coding motion-incompensable objects, since the signal information of the objects are blocked and then coded, the data can be effectively compressed without reduction in image quality.

What is claimed is:

1. An object based video information coding apparatus comprising:

moving image extracting means for extracting unmoving background images and moving objects from an input image signal;

object selection and separation means for selecting and separating motion-compensable objects and motion-incompensable objects from the background images extracted by the moving image extracting means;

first object information separating means for separating motion information and shape information from motion-compensable objects outputted by the object selection and separation means;

second object information separating means for separating shape information and image information from motion-incompensable objects outputted from the first object information separating means;

block location scanning means for dividing motion-incompensable objects outputted from the second object information separating means into N×N blocks;

discrete cosine transform means for performing a discrete cosine transform on pixels of motion-incompensable objects outputted from the block location scanning means that are within an N×N block, and for outputting the transformed information to a decoding circuit; and differential pulse code modulation means for differential pulse code modulating the pixels of a motion-incompensable object obtained from the block location scanning means that are not within an N×N block and for outputting the modulated information to a decoding circuit.

2. The apparatus of claim 1, wherein the moving image extracting means extracts moving images from each frame using a motion vector varying from an initial frame.

3. The apparatus of claim 1, wherein the discrete cosine transform coding means converts pixels in 8×8 blocks and the second object information separation means separates the motion-incompensable objects into 8×8 blocks.

4. The apparatus of claim 1, wherein the block location scanning means divides a motion-incompensable object into 8×8 blocks and divides the remaining portions of the object into 4×4 blocks.

5. The apparatus of claim 4, wherein the second object information separating means further comprises a 4×4 discrete cosine transform coding means for discrete cosine transforming the pixels within the 4×4 blocks.

6. The apparatus of claim 1, wherein motion-incompensable objects are recovered by run-length decoding, inverse quantization, inverse zig-zag scanning, and inverse discrete cosine transformation.

7. The apparatus of claim 6, further comprising discrete cosine transform coding means for converting the remaining portions of the motion-incompensable objects not in the 8×8 and 4×4 blocks.

8. The apparatus of claim 7, wherein motion-incompensable objects are recovered by run-length decoding, inverse quantization, inverse zig-zag scanning, and inverse discrete cosine transformation.

9. An object based video information coding apparatus comprising:

moving image extracting means for separating moving and non-moving background imagery from an input image signal;

object selection separating means for selecting motion-compensable objects and motion-incompensable object from the moving imagery;

first object information separating means for separating motion information and shape information for motion-compensable objects;

second object information separating means for separating shape information and image information for motion-incompensable objects;

frame-difference value detection means for computing difference values for pixels of a current image of a motion-incompensable object and pixels of a previous image using a motion vector of the image signal;

fixed block separating means for dividing a motion-incompensable object into 8×8 blocks using the difference value obtained by the frame-difference value detection means and for dividing a remaining region of the motion-incompensable object into 4×4 blocks;

8×8 discrete cosine transform coding means provided for coding the pixels in the 8×8 blocks using an 8×8 discrete cosine transform; and 4×4 discrete cosine transform coding means provided for coding the pixels in the 4×4 blocks using an 4×4 discrete cosine transform.

10. The apparatus of claim 9, wherein a motion-incompensable object is recovered by an information receiving terminal by run-length decoding, inverse quantization, inverse zig-zag scanning, and inverse discrete cosine transformation.

11. An information coding method in an MPEG-4 system comprising the steps of:

separating moving and non-moving background imagery;

selecting motion-compensable objects and motion-incompensable objects from the moving imagery;

separating motion information and shape information from motion-compensable objects;

separating shape information and image information for motion-incompensable objects;

computing a difference between the pixel values of a current image corresponding to a motion-incompensable object and pixel values of a previous image using a motion vector;

divides a motion-incompensable object into 8×8 blocks using a differential value obtained in the prior step and dividing the remainder of the motion-incompensable object into 4×4 blocks;

discrete cosine transforming pixels in 8×8 blocks using an 8×8 discrete cosine transform; and discrete cosine transforming pixels in 4×4 blocks using a 4×4 discrete cosine transform.

12. The method of claim 11, wherein a motion-incompensable object is recovered at a receiving terminal by run-length decoding, inverse quantization, inverse scanning, and inverse discrete cosine transformation.

* * * * *